US009269988B2

(12) United States Patent
Tamaki et al.

(10) Patent No.: US 9,269,988 B2
(45) Date of Patent: Feb. 23, 2016

(54) METHOD FOR MANUFACTURING SECONDARY BATTERY

(75) Inventors: Takumi Tamaki, Nisshin (JP); Kazuhisa Takeda, Toyota (JP); Ryuichirou Shinkai, Kariya (JP); Hiroe Takenaka, Okazaki (JP); Naoki Wakamatsu, Hekinan (JP); Shinya Sakamoto, Nagoya (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 238 days.

(21) Appl. No.: 14/127,715

(22) PCT Filed: Jun. 20, 2011

(86) PCT No.: PCT/JP2011/064075
§ 371 (c)(1),
(2), (4) Date: Apr. 4, 2014

(87) PCT Pub. No.: WO2012/176272
PCT Pub. Date: Dec. 27, 2012

(65) Prior Publication Data
US 2014/0310950 A1 Oct. 23, 2014

(51) Int. Cl.
*H01M 10/058* (2010.01)
*H01M 2/36* (2006.01)
*H01M 10/0566* (2010.01)
*H01M 10/28* (2006.01)
*H01M 2/10* (2006.01)

(52) U.S. Cl.
CPC ............ *H01M 10/058* (2013.01); *H01M 2/361* (2013.01); *H01M 2/362* (2013.01); *H01M 10/0566* (2013.01); *H01M 10/28* (2013.01); *H01M 2/1083* (2013.01); *Y02E 60/124* (2013.01); *Y10T 29/49108* (2015.01)

(58) Field of Classification Search
CPC ....... H01M 2/36; H01M 2/361; H01M 2/362; H01M 10/0566; H01M 10/058; H01M 10/28; H01M 2/1083; Y02E 60/124; Y10T 29/49108
See application file for complete search history.

(56) References Cited

FOREIGN PATENT DOCUMENTS

| JP | 8-31458 | 2/1996 |
|---|---|---|
| JP | 2000-123872 | 4/2000 |
| JP | 2002-270225 | 9/2002 |
| JP | 2006-351249 | 12/2006 |
| JP | 2008-98107 | 4/2008 |

*Primary Examiner* — Carlos Barcena
(74) *Attorney, Agent, or Firm* — Finnegan, Henderson, Farabow, Garrett & Dunner, LLP

(57) ABSTRACT

A method for manufacturing a secondary battery determines the amount of the non-aqueous electrolyte to be injected into the bound cell case on the basis of an amount of air space in a positive electrode active material layer, a swelling rate of the positive electrode active material layer, an amount of air space in a negative electrode active material layer, a swelling rate of the negative electrode active material layer, an amount of air space in a separator sheet, a total surface area of an opposing surface of the positive electrode active material layer and the negative electrode active material layer, and a reference electrolyte amount per unit surface area, which is determined in accordance with a binding rate.

5 Claims, 6 Drawing Sheets

METHOD FOR MANUFACTURING SECONDARY BATTERY

CROSS-REFERENCE TO RELATED APPLICATIONS

This application is a national phase application of International Application No. PCT/JP2011/064075, filed Jun. 20, 2011, the content of which is incorporated herein by reference.

TECHNICAL FIELD

The present invention relates to a method for manufacturing a secondary battery, and more particularly to a method for manufacturing a battery having a wound electrode assembly wound into a flattened shape.

BACKGROUND ART

Lithium ion secondary batteries, nickel hydrogen batteries, and other secondary batteries have increased in importance as power supplies installed in vehicles that use electricity as a drive source or power supplies used in electrical products such as personal computers and portable terminals, for example. A lithium ion secondary battery in particular is lightweight and exhibits a high energy density, and may therefore be used favorably as a high output power supply for installation in a vehicle.

In a typical configuration for a lithium ion secondary battery of this type, a wound electrode assembly formed in a flattened shape and obtained by winding and pressing a positive electrode sheet and a negative electrode sheet between which a separator sheet is interposed is housed in an angular battery case (typically a flattened box-shaped case) together with a non-aqueous electrolyte.

The non-aqueous electrolyte is a medium for conducting a carrier (typically cations, for example lithium ions) during charging and discharging of the secondary battery, and when an amount of non-aqueous electrolyte injected into the battery case is inappropriate, various battery characteristics cannot be exhibited sufficiently. When the amount of non-aqueous electrolyte is smaller than an appropriate amount, the electrolyte may be depleted (a so-called liquid shortage may occur) following repeated charging and discharging, leading to an increase in a battery resistance and a corresponding reduction in output. When the amount of non-aqueous electrolyte is larger than the appropriate amount, on the other hand, cations may flow out into surplus non-aqueous electrolyte that cannot be contained within the wound electrode assembly and therefore exists on the outside of the electrode assembly, leading to a reduction in output. These problems tend to occur particularly easily during use (charging and discharging) at a high rate (a high output of 5 C or more, for example). Patent Literature 1 to 5 may be cited as technical documents relating to an amount of electrolyte to be injected into a secondary battery. Patent Literature 1, for example, describes a technique of attempting to determine the amount of electrolyte to be injected from an opposing surface area of positive and negative electrodes.

CITATION LIST

Patent Literature

Patent Literature 1: Japanese Patent Application Laid-open No. 2008-098107

Patent Literature 2: Japanese Patent Application Laid-open No. 2006-351249

Patent Literature 3: Japanese Patent Application Laid-open No. 2002-270225

Patent Literature 4: Japanese Patent Application Laid-open No. 2000-123872

Patent Literature 5: Japanese Patent Application Laid-open No. H08-031458

SUMMARY OF INVENTION

Incidentally, when the secondary battery is charged and discharged repeatedly, the wound electrode assembly housed in the battery case may deform, leading to a reduction in the output of the secondary battery, and therefore the battery case is bound as a measure for preventing deformation of the wound electrode assembly. When the non-aqueous electrolyte is injected into the battery case during manufacture of the secondary battery such that the wound electrode assembly is impregnated with the non-aqueous electrolyte, the electrode assembly swells (expands), leading to an increase in a volume thereof, and therefore an amount of non-aqueous electrolyte impregnating the electrode assembly inside, in particular an amount of non-aqueous electrolyte existing between the positive electrode sheet and the negative electrode sheet, varies according to a tightness with which the battery case is bound. Hence, when determining the amount of non-aqueous electrolyte to be injected into the battery case, it is necessary to measure variation in the required amount of electrolyte depending on the tightness with which the battery case is bound.

The present invention has been designed to solve the problems in the related art described above, and an object thereof is to provide a manufacturing method for a secondary battery that exhibits superior battery characteristics, in particular a cycle characteristic, as a result of determining an appropriate amount of a non-aqueous electrolyte to be injected into a cell case from a tightness with which the cell case is bound.

To achieve the object described above, the present invention provides a method for manufacturing a secondary battery. The method for manufacturing a secondary battery disclosed herein includes: preparing an elongated positive electrode sheet in which a positive electrode active material layer is formed on a positive electrode collector; preparing an elongated negative electrode sheet in which a negative electrode active material layer is formed on a negative electrode collector; forming a flattened wound electrode assembly by winding and then flattening the positive electrode sheet and the negative electrode sheet between which an elongated separator sheet is interposed; housing the wound electrode assembly in an angular cell case having two wide surfaces that correspond respectively to flattened surfaces of the wound electrode assembly; binding the cell case by applying a load to the two opposing wide surfaces of the cell case from an outside of the cell case such that the wide surfaces approach each other (i.e. in a direction intersecting (typically a direction orthogonal to) the two wide surfaces that oppose each other on opposite sides of an internal space of the cell case); and injecting a non-aqueous electrolyte into the bound cell case. Here, an injection amount X [ml] of the non-aqueous electrolyte is determined on the basis of a following Equation (1):

$$X = (Ap \times Bp) + (An \times Bn) + C + (D \times E) \qquad (1).$$

In Equation (1), Ap is an amount of air space [ml] in the positive electrode active material layer.

Bp is a swelling rate determined from $Tp_1/Tp_0$, where $Tp_0$ is a thickness of the positive electrode active material layer before the positive electrode active material layer is impregnated with the non-aqueous electrolyte, and $Tp_1$ is a thickness of the positive electrode active material layer after the positive electrode active material layer is impregnated with the non-aqueous electrolyte.

An is an amount of air space [ml] in the negative electrode active material layer.

Bn is a swelling rate determined from $Tn_1/Tn_0$, where $Tn_0$ is a thickness of the negative electrode active material layer before the negative electrode active material layer is impregnated with the non-aqueous electrolyte, and Tn) is a thickness of the negative electrode active material layer after the negative electrode active material layer is impregnated with the non-aqueous electrolyte.

C is an amount of air space [ml] in the separator sheet.

D is a total surface area [$cm^2$] of an opposing surface of the positive electrode active material layer and the negative electrode active material layer.

E is a reference electrolyte amount [$ml/cm^2$] per unit surface area of the opposing surface, which is determined in accordance with a binding rate [%] determined from $(L_0-L_1)/L_0 \times 100$, where $L_0$ is a distance between an inner side of the wide surface of the cell case and the flattened surface of the wound electrode assembly before the cell case is bound, and $L_1$ is a distance between the inner side of the wide surface of the cell case and the flattened surface of the wound electrode assembly after the cell case is bound.

In the manufacturing method for a secondary battery provided by the present invention, the non-aqueous electrolyte amount X [ml] to be injected into the cell case is determined by determining the amount of non-aqueous electrolyte with which the positive electrode sheet, the negative electrode sheet, and the separator sheet are to be impregnated, and determining the reference electrolyte amount existing between the sheets from the binding rate of the cell case in which the wound electrode assembly, formed by winding the sheets, is housed.

The amount of non-aqueous electrolyte determined using the method described above is set in consideration of the reference electrolyte amount determined in accordance with the binding rate of the cell case, and therefore an appropriate amount of the non-aqueous electrolyte can be injected into the cell case housing the formed wound electrode assembly. Hence, according to this method, the non-aqueous electrolyte injected into the cell case is neither insufficient nor excessive, and therefore a secondary battery exhibiting a superior cycle characteristic can be manufactured.

In a preferred aspect of the manufacturing method disclosed herein, when the cell case is bound such that the binding rate is between 90% and 100%, a value of E is determined within a range of $0.9 \times 10^{-3}$ $ml/cm^2$ to $1.7 \times 10^{-3}$ $ml/cm^2$.

According to this aspect, the cell case is bound at a binding rate within the above range, and therefore deformation of the wound electrode assembly housed in the cell case can be reduced even when the secondary battery is charged and discharged repeatedly. As a result, a reduction in output can be prevented.

In another preferred aspect of the manufacturing method disclosed herein, a positive electrode sheet having a positive electrode active material layer with a active material density set such that a value of Bp is within a range of 1.02 to 1.09 is used.

According to this aspect, an increase in resistance during high rate charging and discharging can be reduced, and as a result, a secondary battery exhibiting a superior cycle characteristic can be manufactured.

In another preferred aspect of the manufacturing method disclosed herein, a negative electrode sheet having a negative electrode active material layer with a active material density set such that a value of Bn is within a range of 1.03 to 1.09 is used.

According to this aspect, an increase in resistance during high rate charging and discharging can be reduced, and a high battery capacity can be maintained. As a result, a secondary battery exhibiting a superior cycle characteristic can be manufactured.

In another preferred aspect of the manufacturing method disclosed herein, a plurality of cell cases each housing the wound electrode assembly are arranged such that the wide surfaces of the respective cell cases oppose each other, the plurality of cell cases are bound by applying a load to the plurality of cell cases in an arrangement direction thereof, and an amount of the non-aqueous electrolyte to be injected into each cell case is determined on the basis of the binding rate of each cell case.

In other words, according to this aspect, in a method of manufacturing a battery pack formed by arranging a plurality of cell cases (typically, by electrically connecting a plurality of cells), an appropriate amount of non-aqueous electrolyte can be injected into each cell case even when the binding rates of the respective cell cases differ from each other due to size (arrangement direction thickness) variation among the wound electrode assemblies housed in the cell cases. As a result, a battery pack in which variation in performance among the respective cells is reduced can be manufactured.

DESCRIPTION OF EMBODIMENTS

A preferred embodiment of the present invention will be described below. Note that matter required to implement the present invention other than items noted particularly in the present specification may be understood as design matter to be implemented by a person skilled in the art on the basis of conventional techniques in the corresponding field. The present invention can be implemented on the basis of the content disclosed in the present specification and technical common knowledge in the corresponding field.

A preferred embodiment of the manufacturing method for a secondary battery disclosed herein will be described in detail using as an example a method of manufacturing a lithium ion secondary battery having an electrode in which an electrode active material layer is formed on a surface of an electrode collector. However, the present invention is not limited in application to this battery.

In the manufacturing method for a secondary battery disclosed herein, an injection amount X [ml] of a non-aqueous electrolyte injected into a cell case is determined on the basis of a following equation (1):

$$X=(Ap \times Bp)+(An \times Bn)+C+(D \times E) \quad (1).$$

Ap is an amount of air space [ml] in a positive electrode active material layer formed on a positive electrode sheet. The air space amount Ap is determined from a product of an apparent volume Vp and a porosity (a hole ratio) Hp of the positive electrode active material layer, for example. In other words, Ap=Vp×Hp. Here, the porosity Hp is determined from a mass Wp of the positive electrode active material layer, the apparent volume Vp of the positive electrode active material layer, and a true density $\rho_p$ (a value obtained by dividing the mass Wp by a solid volume not including holes) of the positive electrode active material layer using Hp [%]=(1−Wp/$\rho_p$Vp)×100, for example.

Figure 4:
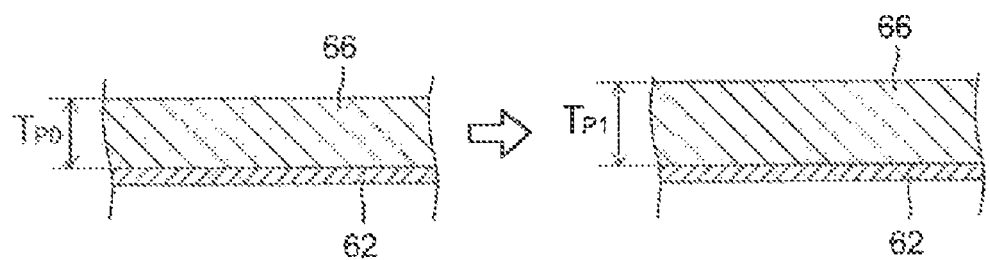
FIG. 4 is a schematic illustrative view showing a method of determining a swelling rate of an electrode active material layer.

Bp is a swelling rate of the positive electrode active material layer when impregnated with the non-aqueous electrolyte. As shown in FIG. 4, the swelling rate Bp can be determined from $Tp_1/Tp_0$, where $Tp_0$ is a thickness of a positive electrode active material layer 66 before the positive electrode active material layer 66 is impregnated with the non-aqueous electrolyte (dimethyl carbonate not containing lithium salt, for example), and $Tp_1$ is the thickness of the positive electrode active material layer 66 after the positive electrode active material layer 66 is impregnated with the non-aqueous electrolyte. At this time, the positive electrode active material layer 66 is impregnated with a sufficient amount of the non-aqueous electrolyte for a predetermined time (at least 6 hours, and more preferably at least 24 hours, for example) so that the non-aqueous electrolyte spreads through the entire positive electrode active material layer 66. Note that in this specification, the "thickness of the active material layer" indicates an average thickness, which can be measured using a micrometer or from a cross-sectional SEM (scanning electron microscope) photograph.

A positive electrode sheet in which a value of the swelling rate Bp is between 1.01 or 1.02 and 1.09 or 1.11 is preferably used as the positive electrode sheet. For example, a positive electrode sheet in which the value of the swelling rate Bp is between 1.01 and 1.11 is preferably used. More preferably, a positive electrode sheet of 1.02 to 1.09 is used. The swelling rate Bp can be adjusted by adjusting a pressing force applied when forming the positive electrode active material layer.

An is an amount of air space [ml] in a negative electrode active material layer formed on a negative electrode sheet. The air space amount An, similarly to the air space amount Ap described above, is determined from a product of an apparent volume Vn and a porosity (a hole ratio) Hn of the negative electrode active material layer, for example. In other words, An=Vn×Hn. Here, the porosity Hn is determined from a mass Wn of the negative electrode active material layer, the apparent volume Vn of the negative electrode active material layer, and a true density $\rho_n$ (a value obtained by dividing the mass Wn by a solid volume not including holes) of the negative electrode active material layer using Hn [%]=(1−Wn/$\rho_n$Vn)×100, for example.

Bn is a swelling rate of the negative electrode active material layer when impregnated with the non-aqueous electrolyte. Similarly to the swelling rate Bp of the positive electrode active material layer, described above, the swelling rate Bn can be determined from $Tn_1/Tn_0$, where $Tn_0$ is a thickness of the negative electrode active material layer before the negative electrode active material layer is impregnated with the non-aqueous electrolyte, and $Tn_1$ is the thickness of the negative electrode active material layer after the negative electrode active material layer is impregnated with the non-aqueous electrolyte.

A negative electrode sheet in which a value of the swelling rate Bn is between 1.03 or 1.05 and 1.09 or 1.13 is preferably used as the negative electrode sheet. For example, a negative electrode sheet of 1.03 to 1.09, or more preferably a negative electrode sheet of 1.05 to 1.09, is used. The swelling rate Bn can be adjusted by adjusting the pressing force applied when forming the negative electrode active material layer.

C is an amount of air space [ml] in a separator sheet. The air space amount C is determined from a product of an apparent volume Vs and a porosity (a hole ratio) Hs of the separator sheet, for example. In other words, C=Vs×Hs. Here, the porosity Hs is determined from a mass Ws of the separator sheet, the apparent volume Vs of the separator sheet, and a true density $\rho_s$ (a value obtained by dividing the mass Ws by a solid volume not including holes) of the separator sheet using Hs [%]=(1−Ws/$\rho_s$Vs)×100, for example. The porosity of the separator sheet can be controlled by adjusting an amount of a plasticizer used in the separator, a draw ratio of the separator and so on to desired values.

Note that the porosity Hp of the positive electrode sheet, the porosity Hn of the negative electrode sheet, and the porosity Hs of the separator sheet can also be calculated by a mercury penetration method using a mercury porosimeter.

D is a total surface area [cm²] of an opposing surface of the positive electrode active material layer formed on the positive electrode sheet and the negative electrode active material layer formed on the negative electrode sheet. D typically represents a total surface area [cm²] of a positive electrode active material layer formed on both surface (or either surface) of a sheet-shaped positive electrode collector constituting the positive electrode sheet.

E is a reference electrolyte amount [ml/cm²] per unit surface area of the opposing surface of the positive electrode active material layer and the negative electrode active material layer. In other words, E is an amount of non-aqueous electrolyte per unit surface area contained in a gap between the positive electrode active material layer and the negative electrode active material layer (typically a gap between the positive electrode active material layer and the separator sheet and a gap between the separator sheet and the negative electrode active material layer), which is determined in accordance with a binding rate (a binding tightness) F obtained when the cell case is bound.

The binding rate F is determined from F [%]=($L_0$−$L_1$)/$L_0$×100, where $L_0$ is a distance between an inner side of a wide surface of the cell case and a flattened surface of a wound electrode assembly before the cell case is bound, and $L_1$ is the distance between the inner side of the wide surface of the cell case and the flattened surface of the wound electrode assembly after the cell case is bound. Here, "binding" the cell case means applying a load to two wide surfaces of the cell case, which oppose each other via an internal space of the cell case, from the outside of the cell case in a direction that intersects the two wide surfaces (typically an orthogonal direction, or in other words a vertical direction in FIG. 5, to be described below) such that the two opposing wide surfaces of the cell case approach each other.

Figure 5:
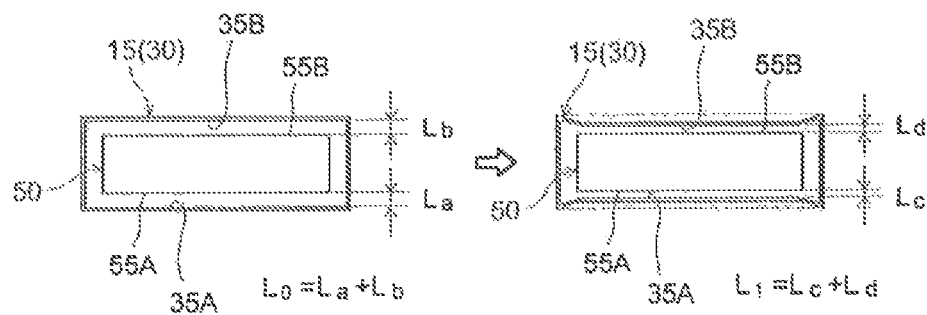
FIG. 5 is a schematic illustrative view showing a method of determining a binding rate F of the secondary battery.

For example, as shown in FIG. 5, $L_0$ is a total length of a distance $L_a$ between an inner side 35A of a wide surface of a cell case 15 (a case main body 30) and a flattened surface 55A of a wound electrode assembly 50 and a distance $L_b$ between an inner side 35B and a flattened surface 55B before the cell case 15 is bound (in other words, $L_0=L_a+L_b$). Further, $L_1$ is a total length of a distance $L_c$ between the inner side 35A of the wide surface of the cell case 15 (the case main body 30) and the flattened surface 55A of the wound electrode assembly 50 and a distance $L_d$ between the inner side 35B and the flattened surface 55B after the cell case 15 is bound (in other words, $L_1=L_c+L_d$).

The binding rate F is preferably within a range of 90% to 100%. When the binding rate F is much lower than 90%, the wound electrode assembly may deform following repeated charging and discharging of the secondary battery, leading to a reduction in output. When the binding rate F exceeds 100%, on the other hand, the cell case may crush the wound electrode assembly, causing a defect.

A preferred example of a procedure that can be employed to determine a relationship between the reference electrolyte amount E [ml/cm$^2$] and the binding rate F [%] will now be described.

First, a positive electrode sheet on which Ap, Bp, and D have been measured, a negative electrode sheet on which An and Bn have been measured, and a separator sheet on which C has been measured are prepared, whereupon a flattened wound electrode assembly is formed by winding and then flattening the positive electrode sheet and the negative electrode sheet between which the separator sheet is interposed. The formed wound electrode assembly is housed in an angular cell case having two wide surfaces corresponding respectively to flattened surfaces of the wound electrode assembly. At this time, the distance $L_0$ between the inner side of the wide surface of the cell case and the flattened surface of the wound electrode assembly is measured. After measuring the distance $L_0$, the cell case is bound by applying a load to the two opposing wide surfaces of the cell case from the outside of the cell case so that the wide surfaces approach each other. At this time, the distance $L_1$ between the inner side of the wide surface of the cell case and the flattened surface of the wound electrode assembly is measured, whereupon the binding rate F [%] is determined from $(L_0-L_1)/L_0 \times 100$.

Next, a sufficient amount (Z [ml]) of the non-aqueous electrolyte is injected into the cell case bound at the binding rate F. Following the elapse of a sufficient amount of time (for example, at least 6 hours, and more preferably at least 24 hours) for the non-aqueous electrolyte to impregnate the entire wound electrode assembly, the wound electrode assembly impregnated with the non-aqueous electrolyte is extracted, whereupon the amount (X [ml]) of non-aqueous electrolyte impregnating the wound electrode assembly is calculated from an amount (Y [ml]) of non-aqueous electrolyte remaining in the cell case (i.e. X [ml]=Z−Y). By inserting X, Ap, Bp, An, Bn, C, and D into Equation (1), E [ml/cm$^2$] can be calculated. By varying the binding rate F within the range of 90% to 100% that is anticipated during normal use and calculating the value of E in relation to the respective binding rates F, a relational expression indicating a correlation between the binding rate F and E is determined in advance.

Figure 6:
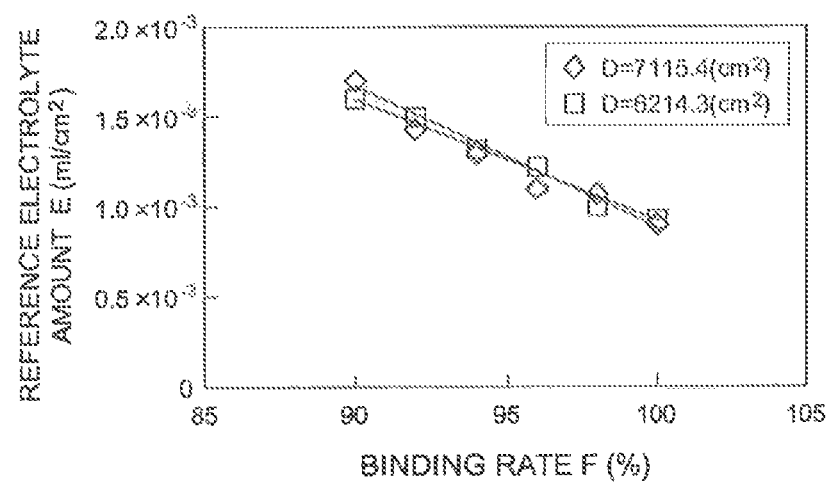
FIG. 6 is a graph showing a relationship between the binding rate F and a reference electrolyte amount E.

FIG. 6 is a graph showing the relationship between the binding rate F [%] and the reference electrolyte amount E [ml/cm$^2$]. On the graph, a positive electrode sheet a in which Ap was 6.7 ml, Bp was 104, and D was 7115.4 cm$^2$ and a positive electrode sheet b in which Ap was 6.7 ml, Bp was 104, and D was 6214.3 cm$^2$ were prepared as the positive electrode sheet. A negative electrode sheet a in which An was 7 ml and Bn was 103 was prepared as the negative electrode sheet. A separator sheet a in which C was 7.87 ml was prepared as the separator sheet. Six wound electrode assemblies a respectively constituted by the positive electrode sheet a, the negative electrode sheet a, and the separator sheet a were manufactured, the cell cases housing the wound electrode assemblies a were bound at respective binding rates F of 90%, 92%, 94%, 96%, 98%, and 100%, and values of the reference electrolyte amount E relative to the respective binding rates F were calculated using the method described above. Results are shown on Table 1. Having determined a relational expression (a linear approximation of a curve) indicating the correlation between F and E with regard to the wound electrode assembly a (D=7115.4 cm$^2$) using the results, it was found that E=−0.0754F+8.4157, R$^2$=0.9601. Meanwhile, six wound electrode assemblies b respectively constituted by the positive electrode sheet b, the negative electrode sheet a, and the separator sheet a were manufactured, whereupon values of the reference electrolyte amount E relative to the respective binding rates F were calculated in a similar manner to the wound electrode assembly a. Results are shown on Table 1. Having determined a relational expression indicating the correlation between F and E with regard to the wound electrode assembly b (D=6214.3 cm$^2$) using the results, it was found that E=−0.0707F+7.9795, R$^2$=0.9863.

TABLE 1

| Binding rate (F) [%] | Reference electrolyte amount (E) [ml/cm$^2$] (total surface area D = 7115.4 [cm$^2$]) | Reference electrolyte amount (E) [ml/cm$^2$] (total surface ares D = 6214.3 [cm$^2$]) |
| --- | --- | --- |
| 90 | $1.7 \times 10^{-3}$ | $1.6 \times 10^{-3}$ |
| 92 | $1.43 \times 10^{-3}$ | $1.5 \times 10^{-3}$ |
| 94 | $1.3 \times 10^{-3}$ | $1.32 \times 10^{-3}$ |
| 96 | $1.1 \times 10^{-3}$ | $1.22 \times 10^{-3}$ |
| 98 | $1.07 \times 10^{-3}$ | $1 \times 10^{-3}$ |
| 100 | $0.9 \times 10^{-3}$ | $0.93 \times 10^{-3}$ |

As shown in FIG. 6 and on Table 1, it was confirmed that the total surface area D of the positive electrode active material layer has substantially no effect on the relationship between the binding rate F and the reference electrolyte amount E. It was also confirmed that when the binding rate F is between 90% and 100%, the reference electrolyte amount E is within a range of $0.9 \times 10^{-3}$ ml/cm$^2$ to $1.7 \times 10^{-3}$ ml/cm$^2$.

In the manufacturing method for a secondary battery disclosed herein, when the non-aqueous electrolyte is injected into the cell case, the injection amount X [ml] of the non-aqueous electrolyte is determined on the basis of Equation (1), and therefore the possibility of too little or too much non-aqueous electrolyte being injected into the cell case is reduced. Hence, a secondary battery injected with an appropriate amount of non-aqueous electrolyte can be manufactured. As a result, a secondary battery manufactured using the method according to the present invention can exhibit a superior cycle characteristic.

The positive electrode sheet (positive electrode) disclosed herein is a positive electrode for a lithium ion secondary battery, and includes a positive electrode collector and a positive electrode active material layer formed on the positive electrode collector. A metallic collector made of a similar material to a collector used for a positive electrode of a conventional lithium ion secondary battery may be used as the positive electrode collector constituting the positive electrode. For example, an aluminum material or an alloy material having aluminum as a main body may be used favorably as a constituent material of a positive electrode collector for a battery of this type. The positive electrode collector is preferably sheet-shaped, and in this case, a thickness thereof is preferably set within a range of approximately 10 µm to 30 µm, for example.

A material capable of storing and releasing lithium ions, such as a lithium-containing compound containing a lithium element and one, two, or more transition metal elements (for example, a lithium transition metal composite oxide) may be used as a positive electrode active material used in the positive electrode of the lithium ion secondary battery disclosed herein. For example, a lithium nickel composite oxide ($LiNiO_2$, for example), a lithium cobalt composite oxide ($LiCoO_2$, for example), a lithium manganese composite oxide ($LiMn_2O_4$, for example), or a tertiary system lithium-containing composite oxide such as a lithium nickel cobalt manganese composite oxide ($LiNi_{1/3}Co_{1/3}Mn_{1/3}O_2$, for example) may be used.

Further, a polyanionic compound (for example, $LiFePO_4$, $LiMnPO_4$, $LiFeVO_4$, $LiMnVO_4$, $Li_2FeSiO_4$, $Li_2MnSiO_4$, or $Li_2CoSiO_4$) expressed by a general formula $LiMPO_4$ or $LiMVO_4$ or $Li_2MSiO_4$ (where M in the formula represents one or more elements from Co, Ni, Mn, Fe) or the like may be used as the positive electrode active material.

If necessary, the positive electrode active material layer used in the positive electrode of the lithium ion secondary battery disclosed herein may contain, in addition to the positive electrode active material described above, desired components such as a conductive material and a binding material (a binder).

Any conductive material used in a conventional lithium ion secondary battery of this type may be used as the conductive material, and the conductive material is not limited to a specific type. For example, a carbon material such as carbon powder or carbon fiber may be used. Carbon powder such as various types of carbon black (for example, acetylene black, furnace black, Ketjen black, and so on) or graphite powder may be used as the carbon powder. One, two, or more types of conductive materials may be used in conjunction.

A similar binding material to a binding material used in a positive electrode of a typical lithium ion secondary battery may be employed appropriately as the binding material (binder). For example, when a solvent-based paste form composition (a paste form composition includes a slurry form composition and an ink form composition) is used as a composition forming the positive electrode active material layer, a polymer material that dissolves in an organic solvent (a non-aqueous solvent), such as polyvinylidene fluoride (PVDF) or polyvinylidene chloride (PVDC), may be used. Alternatively, when an aqueous paste form composition is used, a polymer material that dissolves or disperses in water may be employed favorably. For example, polytetrafluoroethylene (PTFE), carboxy methyl cellulose (CMC), and so on may be used. Note that the polymer materials cited above may also be used as a composition thickener or another added material as well as being used as a binding material.

Here, the term "solvent-based paste form composition" is a concept indicating compositions in which a dispersion medium of the positive electrode active material is mainly an organic solvent. N-methyl pirrylidone (NMP) or the like, for example, may be used as the organic solvent. The term "aqueous paste form composition" is a concept indicating compositions in which water or a mixed solvent having water as a main body is used as the dispersion medium of the positive electrode active material. One, two, or more types of organic solvents (lower alcohol, lower ketone, and so on) that can be mixed evenly with water may be selected appropriately for use as solvents other than water constituting the mixed solvent.

The positive electrode sheet (positive electrode) disclosed herein can be manufactured favorably using a following schematic procedure, for example. A paste form positive electrode active material layer forming composition is prepared by dispersing the positive electrode active material described above together with a conductive material, a binding material that is soluble in an organic solvent, and so on through an organic solvent. The prepared composition is applied to a sheet-shaped positive electrode collector and then dried, whereupon the resulting component is compressed (pressed). As a result, a positive electrode sheet including the positive electrode collector and the positive electrode active material layer formed on the positive electrode collector can be manufactured.

Next, respective constituent elements of the negative electrode sheet (negative electrode) of the lithium ion secondary battery disclosed herein will be described. The negative electrode sheet disclosed herein is a negative electrode sheet for a lithium ion secondary battery, and includes a negative electrode collector and a negative electrode active material layer formed on the negative electrode collector. A copper material, a nickel material, or an alloy material having these materials as a main body, for example, may be used favorably as the negative electrode collector constituting the negative electrode sheet. The negative electrode collector is preferably sheet-shaped. When a copper sheet is used, a thickness thereof is preferably set within a range of approximately 6 µm to 30 µm, for example.

One, two, or more types of materials used for a negative electrode of a conventional lithium ion secondary battery may be used with no particular limitations as a negative electrode active material used for the negative electrode of the lithium ion secondary battery disclosed herein. For example, a carbon material such as graphite, an oxide material such as lithium titanium oxide ($Li_4Ti_5O_{12}$), a metal such as tin, aluminum (Al), zinc (Zn), or silicon (Si), a metallic material constituted by a metal alloy having these metallic elements as a main body, and so on may be used. A graphite material such as natural graphite or synthetic graphite may also be used favorably.

If necessary, the negative electrode active material layer may contain, in addition to the negative electrode active material described above, desired components such as a binding material (a binder) and a thickener.

A similar binding material to a binding material used in a negative electrode of a typical lithium ion secondary battery may be employed appropriately as the binding material. For example, when an aqueous paste form composition is used to form the negative electrode active material layer, a polymer material that dissolves or disperses in water may be employed favorably. Examples of polymer materials that disperse in water (i.e. water dispersed polymer materials) include types of rubber such as styrene butadiene rubber (SBR) and fluororubber, fluorine based resins such as polyethylene oxide (PEO) and polytetrafluoroethylene (PTFE), vinyl acetate copolymer, and so on.

Further, a polymer material that dissolves or disperses in water or a solvent (an organic solvent) may be employed as the thickener. Examples of polymer materials that dissolve in water (i.e. water soluble polymer materials) include cellulose based polymers such as carboxy methyl cellulose (CMC), methyl cellulose (MC), cellulose acetate phthalate (CAP), or hydroxypropyl methylcellulose (HPMC), polyvinyl alcohol (PVA), and so on.

The negative electrode active material layer is formed by, for example, preparing (preparing, purchasing, or the like) a paste form negative electrode active material layer forming composition in which the negative electrode active material described above and other desired components (a binding material, a thickener, and so on) are dispersed through an appropriate solvent (water, for example), applying the composition to a surface of a negative electrode collector, drying the composition, and then pressing (compressing) the resulting component as required. In so doing, a negative electrode including a negative electrode collector and a negative electrode active material layer can be manufactured.

A similar separator sheet to a conventional separator sheet may be used as the separator sheet disclosed herein. For example, a porous sheet made of resin (a resin sheet having multiple minute holes) may be used favorably. A polyolefin based resin such as polyethylene (PE), polypropylene (PP), or polystyrene is preferable as a material constituting the porous sheet. A porous polyolefin sheet such as a PE sheet, a PP sheet, a double-layer structured sheet formed by laminating a PE layer and a PP layer, or a triple-layer structured sheet formed by sandwiching a single PE layer between two PP layers may be used particularly favorably. Further, a heat resistant layer containing an inorganic filler and a binder may be provided on a surface of the resin layer of the separator sheet.

A non-aqueous electrolyte formed by dissolving a lithium salt capable of functioning as an electrolyte in a non-aqueous solvent (an organic solvent) may be used as the electrolyte. A lithium salt used in a conventional lithium ion secondary battery may be selected appropriately for use as the electrolyte. Examples of this type of lithium salt include $LiPF_6$, $LiClO_4$, $LiAsF_6$, $Li(CF_3SO_2)_2N$, $LiBF_4$, $LiCF_3SO_3$, and so on. A single type of electrolyte may be used alone, or two or more types may be used in combination. $LiPF_6$ may be cited as a particularly preferred example. Examples of the non-aqueous solvent include carbonates such as ethylene carbonate (EC), ethylmethyl carbonate (EMC), dimethyl carbonate (DMC), diethyl carbonate (DEC), and propylene carbonate (PC). A single type of non-aqueous solvent may be used alone, or two or more types may be used in combination.

An embodiment of a lithium ion secondary battery in which the injection amount X of the non-aqueous electrolyte injected into the cell case is determined in accordance with Equation (1) will now be described with reference to the drawings. Note, however, that the present invention is not limited to this embodiment. In the following embodiment, a lithium ion secondary battery formed by housing a wound electrode assembly and an electrolyte in an angular (typically a flattened rectangular parallelepiped-shaped) battery case will be described as an example.

Note that in the drawings to be described below, identical reference symbols have been allocated to members and sites exhibiting identical actions, and duplicate description thereof may be omitted. Further, dimensional relationships (lengths, widths, thicknesses, and so on) in the drawings do not always reflect actual dimensional relationships.

Figure 1:
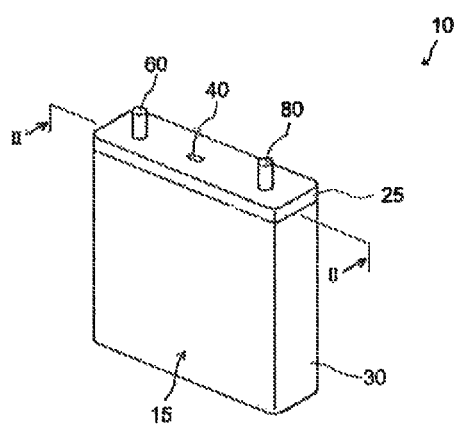
FIG. 1 is a schematic perspective view showing an outer shape of a secondary battery according to an embodiment.
Figure 2:
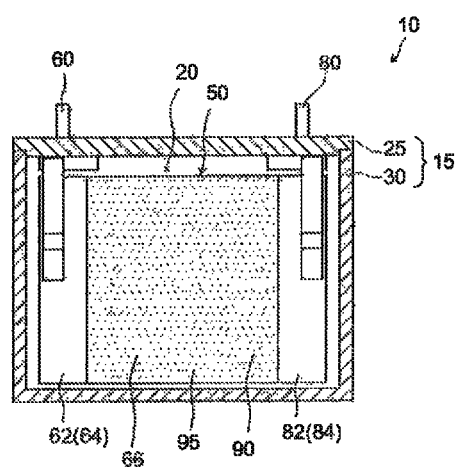
FIG. 2 is a sectional view taken along a II-II line in FIG. 1.

FIG. 1 is a schematic perspective view showing a lithium ion secondary battery (a secondary battery) 10 according to this embodiment, and FIG. 2 is a longitudinal sectional view taken along a II-II line in FIG. 1.

As shown in FIG. 1, the lithium ion secondary battery 10 according to this embodiment includes a metallic (resin or laminate film may also be used favorably) cell case 15. The cell case (outer container) 15 includes a rectangular parallelepiped-shaped case main body 30 having an open upper end and two wide surfaces corresponding respectively to flattened surfaces of a wound electrode assembly 50, and a lid 25 closing an opening portion 20 thereof. The lid 25 is welded or the like so as to seal the opening portion 20 of the case main body 30. A positive electrode terminal 60 that is electrically connected to a positive electrode sheet (a positive electrode) 64 of the wound electrode assembly 50 and a negative electrode terminal 80 that is electrically connected to a negative electrode sheet 84 of the wound electrode assembly 50 are provided on an upper surface of the cell case 15 (i.e. on the lid 25). Further, similarly to a case of a conventional lithium ion secondary battery, the lid 25 is provided with a safety valve 40 for discharging gas generated in an inside of the cell case 15 when an abnormality occurs in the battery to the outside of the cell case 15. The flattened wound electrode assembly 50, which is manufactured by laminating the positive electrode sheet 64 and the negative electrode sheet 84 via a total of two elongated separator sheets 95, winding a resulting electrode assembly, and then pressing the obtained electrode assembly from a side face direction so that the electrode assembly is crushed flat, is housed in the inside of the cell case 15. The cell case 15 is bound using a binding tool, not shown in the drawings, such that the two opposing wide surfaces approach each other. A non-aqueous electrolyte is injected into the cell case 15 in the injection amount X [ml] determined on the basis of Equation (1), and the wound electrode assembly 50 is impregnated thereby.

As shown in FIG. 2, when laminating the sheets, the positive electrode sheet 64 and the negative electrode sheet 84 are overlapped at a slight offset in a width direction so that a positive electrode active material layer non-forming part (i.e. a part in which a positive electrode active material layer 66 is not formed and a positive electrode collector 62 is exposed) of the positive electrode sheet 64 and a negative electrode active material layer non-forming part (i.e. a part in which a negative electrode active material layer 90 is not formed and a negative electrode collector 82 is exposed) of the negative electrode sheet 84 protrude from respective width direction sides of the separator sheets 95. As a result, the respective electrode active material layer non-forming parts of the positive electrode sheet 64 and the negative electrode sheet 84 respectively protrude outward from a wound core part (i.e. a part in which a positive electrode active material layer forming part of the positive electrode sheet 64, a negative electrode active material layer forming part of the negative electrode sheet 84, and the two separator sheets 95 are tightly wound) in a lateral direction relative to a winding direction of the wound electrode assembly 50. The positive electrode terminal 60 is joined to the positive electrode side protruding part such that the positive electrode sheet 64 of the wound electrode assembly 50 formed in the flattened shape described above is electrically connected to the positive electrode terminal 60. Similarly, the negative electrode terminal 80 is joined to the negative electrode side protruding part such that the negative electrode sheet 84 is electrically connected to the negative electrode terminal 80. Note that the positive and negative electrode terminals 60, 80 may be joined respectively to the positive and negative electrode collectors 62, 82 by ultrasonic welding, resistance welding, or the like, for example.

Next, an example of a battery pack (typically a battery pack formed by connecting a plurality of cells in series) including a plurality of cells, where the lithium ion secondary battery (secondary battery) 10 described above serves as a cell (a single cell), will be described.

Figure 3:
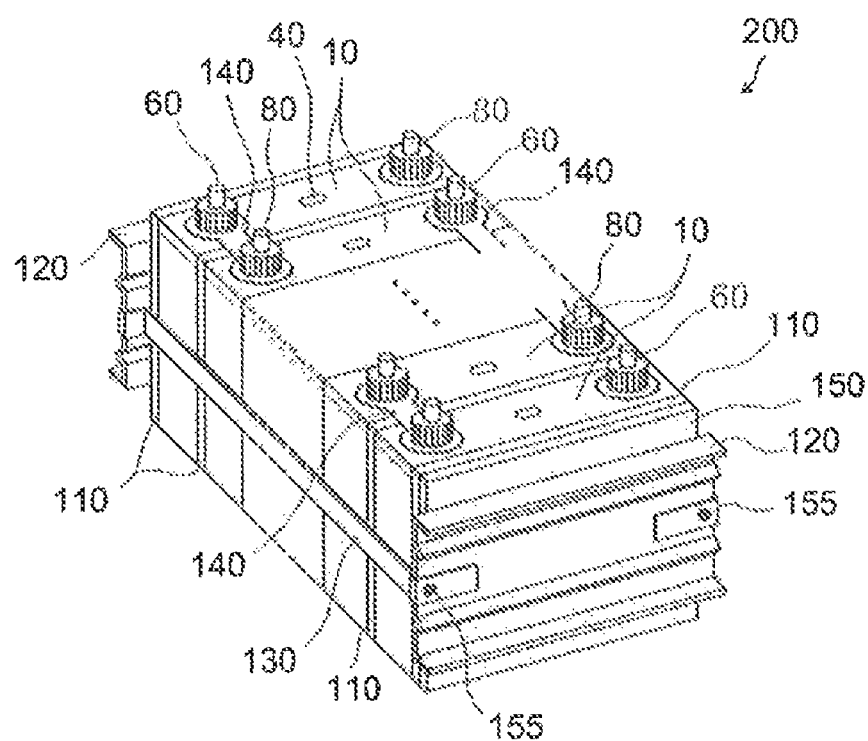
FIG. 3 is a schematic perspective view showing an outer shape of a battery pack according to an embodiment.

As shown in FIG. 3, a battery pack (a secondary battery) 200 includes a plurality of (typically 10 or more, preferably between approximately 10 and 30, for example 20) lithium ion secondary batteries (cells) 10 arranged in a direction (a lamination direction) in which the wide surfaces of the cell cases 15 oppose each other and respectively inverted such that the respective positive electrode terminals 60 and negative electrode terminals 80 thereof are disposed alternately. Cooling plates 110 having a predetermined shape are sandwiched between the arranged cells 10. The cooling plate 110 functions as a heat radiation member for efficiently releasing heat generated in each single cell 10 during use, and preferably has a shape that allows a cooling fluid (typically air) to be introduced between the cells 10 (for example, a shape in which a plurality of parallel grooves extending from one side of the rectangular cooling plate to a vertically opposite side are provided on a surface). A cooling plate made of a metal exhibiting favorable thermal conductivity or a synthetic resin such as lightweight, hard polypropylene is preferable.

A pair of end plates (restraining plates) 120 are disposed on respective ends of the arranged cells 10 and cooling plates 110. Further, one or a plurality of sheet-shaped spacer members 150 may be sandwiched between the cooling plate 110 and the end plate 120 as length adjusting means. The arranged cells 10, cooling plates 110, and spacer members 150 are bound by fastening restraining bands 130 attached so as to straddle the two end plates, whereby a predetermined load is exerted thereon in an arrangement direction (the lamination direction). More specifically, the cells and so on are bound (restrained) such that a predetermined restraining pressure is exerted thereon in the arrangement direction by fastening and fixing end portions of the restraining bands 130 to the end plates 120 using screws 155. As a result, deformation of the wound electrode assembly 50 (see FIG. 2) housed in the inside of the cell case 15 of each cell 10 during high rate charging and discharging can be prevented. Further, in adjacent cells 10, the positive electrode terminal 60 of one cell and the negative electrode terminal 80 of the other cell are electrically connected by a connecting member (a bus bar) 140. By connecting the cells 10 in series in this manner, a battery pack 200 having a desired voltage is constructed. Note that even when variation exists in the sizes of the wound electrode assemblies 50 housed in the respective cell cases 15, by determining the amount of non-aqueous electrolyte to be injected into each cell case 15 on the basis of the binding rate F of each cell case 15 using Equation (1) and injecting the determined amount of non-aqueous electrolyte, defects caused by insufficient or excessive non-aqueous electrolyte can be prevented in all of the cells 10 constituting the battery pack 200 during use of the battery pack 200. As a result, a battery pack 200 exhibiting superior battery characteristics can be obtained.

Examples of the present invention will be described below. Note, however, that the present invention is not limited to the matter described in these examples.

EXPERIMENTAL EXAMPLE 1

First, the constituent members of the wound electrode assembly used in the lithium ion secondary batteries (secondary batteries) of the following respective examples will be described.

(Positive Electrode Sheet A)

A paste form positive electrode active material layer forming composition was prepared by weighing $LiNi_{1/3}Co_{1/3}Mn_{1/3}O_2$, acetylene black, and PVDF, serving respectively as a positive electrode active material, a conductive material, and a binding material (a binder), to obtain a mass ratio of 88:10:2, and then dispersing these materials through NMP. The composition was applied onto aluminum foil (a positive electrode collector) in a coating amount of 6 mg/cm$^2$ per surface, dried, and then processed using a roll press. As a result, an elongated positive electrode sheet A in which a positive electrode active material layer having a active material density of 2.1 g/cm$^3$ was formed on aluminum foil was manufactured. The positive electrode sheet A had an Ap of 6.7 ml and a Bp of 1.04. Further, a total surface area of the opposing surface of the positive electrode active material layer and a negative electrode active material layer of a negative electrode sheet A, or in other words the total surface area D of the positive electrode active material layer, was 7115.4 cm$^2$.

(Negative Electrode Sheet A)

A paste form negative electrode active material layer forming composition was prepared by weighing natural graphite, SBR, and CMC, serving respectively as a negative electrode active material, a binding material, and a thickener, to obtain a mass ratio of 98:1:1, and then dispersing these materials through water. The composition was applied onto copper foil (a negative electrode collector) in a coating amount of 4 mg/cm$^2$ per surface, dried, and then processed using a roll press. As a result, an elongated negative electrode sheet A in which a negative electrode active material layer having a active material density of 1 g/cm$^3$ was formed on copper foil was manufactured. The negative electrode sheet A had an An of 7 ml and a Bn of 1.03.

(Separator Sheet A)

A polypropylene/polyethylene/polypropylene three-layer porous sheet A having a thickness of 20 μm was used. C was 7.87 ml.

[Construction of Lithium Ion Secondary Battery]

EXAMPLE 1

A flattened wound electrode assembly according to Example 1 was manufactured (formed) by interposing two separator sheets A between the manufactured positive electrode sheet A and negative electrode sheet A, rolling the resulting electrode assembly, and then pressing the electrode assembly flat. The electrode assembly was housed in an angular cell case, whereupon the cell case was bound by applying a load to the wide surfaces thereof. The binding rate F at this time was 96%. The reference electrolyte amount E was determined from the above correlation expression (E=−0.0754F+8.4157) and the binding rate F (96%), whereupon the non-aqueous electrolyte was injected into the cell case in the injection amount X (X=29.8 ml) determined on the basis of Equation (1). As a result, two lithium ion secondary batteries according to Example 1 were constructed. A non-aqueous electrolyte obtained by dissolving 1 mol/L of $LiPF_6$ into a mixed solvent of ethylene carbonate (EC), ethylmethyl carbonate (EMC), and dimethyl carbonate (DMC) having a volume ratio of 3:3:4 was used as the non-aqueous electrolyte.

EXAMPLE 2

The non-aqueous electrolyte injection amount was reduced by 2.5 ml to 27.3 ml from the injection amount according to Example 1. Otherwise, two lithium ion secondary batteries according to Example 2 were constructed in a similar manner to Example 1.

EXAMPLE 3

The non-aqueous electrolyte injection amount was increased by 4.9 ml to 34.7 ml from the injection amount according to Example 1. Otherwise, two lithium ion secondary batteries according to Example 3 were constructed in a similar manner to Example 1.

EXAMPLE 4

The non-aqueous electrolyte injection amount was increased by 9 ml to 38.8 ml from the injection amount according to Example 1. Otherwise, two lithium ion secondary batteries according to Example 4 were constructed in a similar manner to Example 1.

(Measurement of Resistance Following Electrolyte Injection)

A resistance value 24 hours after injection of the non-aqueous electrolyte was measured in relation to the respective secondary batteries according to Examples 1 to 4. More specifically, an impedance at an alternating current of 1 kHz was measured in relation to each secondary battery using a commercially available impedance measurement device. Average values of measurement results are shown on Table 2.

TABLE 2

| Example | Injection amount X [ml] | Resistance value after 24 hours [mΩ] | Resistance ratio after 9000 cycles of high rate charging/ discharging | Resistance ratio after 4000 cycles of high temperature charging/ discharging |
| --- | --- | --- | --- | --- |
| Example 1 | 29.8 | 1.31 | 1.44 | 1.27 |
| Example 2 | 27.3 | 2.01 | — | — |
| Example 3 | 34.7 | 1.32 | 1.77 | 1.25 |
| Example 4 | 38.8 | 1.31 | 2.15 | 1.25 |

As shown on Table 2, substantially identical resistance values were obtained in the secondary batteries according to Examples 1, 3, and 4, and it was therefore confirmed that the respective wound electrode assemblies thereof were impregnated with a sufficient amount of electrolyte. In the secondary battery according to Example 2, the amount of electrolyte was insufficient in comparison with the secondary battery according to Example 1, and therefore the entire wound electrode assembly was not impregnated with the electrolyte, leading to an increase in resistance.

(Resistance Measurement Test 1)

A resistance ratio after 9000 cycles of high rate charging/discharging was measured in relation to one of the two secondary batteries according to Example 1 following measurement of the post-electrolyte injection resistance. First, an initial resistance was measured. More specifically, the secondary battery was adjusted to a state of charge of SOC 60% and then subjected to constant current discharging for 10 seconds at 10 C under a temperature condition of 25° C. The initial resistance was determined from an incline of a first order approximate straight line of plotted current (I)–voltage (V) values obtained at this time.

Figure 7:
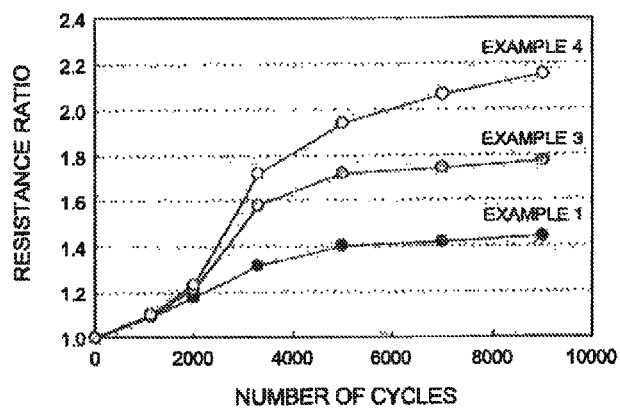
FIG. 7 is a graph showing a relationship between a resistance ratio and a number of cycles in relation to lithium ion secondary batteries according to Examples 1 to 4.

Next, 9000 cycles of charging/discharging were performed on the secondary battery following measurement of the initial resistance while measuring the resistance after 1000, 2000, 3000, 5000, 7000, and 9000 cycles. As regards charging/discharging conditions of a single cycle, the secondary battery was discharged for 10 seconds at 20 C under a temperature condition of −15° C., and following a 5 second pause, the secondary battery was charged for 120 seconds at 2 C. The resistance following the respective numbers of cycles was determined using a similar method to the method used to measure the initial resistance. At this time, a ratio between the initial resistance and the resistance after 9000 cycles (post-9000 cycle resistance/initial resistance) was set as the resistance ratio after 9000 cycles. The resistance ratio after 9000 cycles was measured similarly in relation to the secondary batteries according to Examples 2 to 4. Measurement results are shown in FIG. 7 and on Table 2. Note that since the amount of non-aqueous electrolyte in the secondary battery according to Example 2 was insufficient, the resistance ratio after 9000 cycles could not be measured.

As shown on Table 2 and in FIG. 7, in the secondary batteries according to Examples 3 and 4, the amount of non-aqueous electrolyte injected into the cell case was excessive in comparison with the secondary battery according to Example 1, and therefore a large increase in resistance was confirmed. Hence, it was confirmed that the resistance increases together with the amount of electrolyte.

(Resistance Measurement Test 2)

Further, a resistance ratio after 4000 cycles of high temperature charging/discharging was measured in relation to the other of the two secondary batteries according to Example 1 following measurement of the post-electrolyte injection resistance. First, the initial resistance was measured in a similar manner to Resistance Measurement Test 1.

Next, 4000 cycles of charging/discharging were performed on the secondary battery following measurement of the initial resistance, whereupon the resistance after 4000 cycles was measured. As regards the charging/discharging conditions of a single cycle, the secondary battery was charged to an upper limit voltage of 4.1V using a CC/CV method at 2 C under a temperature condition of 60° C., whereupon the secondary battery was subjected to CC discharging to a lower limit voltage of 3.0 V at 2 C. The resistance after 4000 cycles was determined using a similar method used to measure the initial resistance. At this time, a ratio between the initial resistance and the resistance after 4000 cycles (post-4000 cycle resistance/initial resistance) was set as the resistance ratio after 4000 cycles. The resistance ratio after 4000 cycles was measured similarly in relation to the secondary batteries according to Examples 2 to 4. Measurement results are shown on Table 2. Note that since the amount of non-aqueous electrolyte in the secondary battery according to Example 2 was insufficient, the resistance ratio after 4000 cycles could not be measured.

As shown on Table 2, it was confirmed that the secondary battery according to Example 1 had a substantially identical resistance ratio to the secondary batteries according to Examples 3 and 4, in which the amount of injected non-aqueous electrolyte was excessive. Typically, when charging/discharging is performed repeatedly at a high temperature, the amount of non-aqueous electrolyte in the wound electrode assembly tends to become deficient (a so-called liquid shortage tends to occur). In the secondary battery according to Example 1, however, it was confirmed that the electrolyte did not become deficient, and therefore a superior cycle characteristic was obtained.

Hence, it was confirmed that the non-aqueous electrolyte injection amount determined on the basis of Equation (1) is an appropriate amount.

EXPERIMENTAL EXAMPLE 2

[Positive Electrode Active Material Layer Performance Evaluation Test]

In Examples 1 to 4, the wound electrode assembly was manufactured using the positive electrode sheet A (having a active material density of 2.1 g/cm$^3$, an Ap of 6.7 ml, and a Bp of 1.04), whereupon variation in a battery performance of the lithium ion secondary battery according to the swelling rate Bp of the positive electrode sheet was measured.

EXAMPLE 5

A positive electrode sheet B was manufactured similarly to the positive electrode sheet A, except that the active material density of the positive electrode active material layer was set at 1.8 g/cm$^3$. At this time, Ap was 9.1 ml and Bp was 1.017. A lithium ion secondary battery according to Example 5 was then manufactured using the positive electrode sheet B instead of the positive electrode sheet A but otherwise similarly to Example 1. The injection amount X at this time was 32.2 ml.

EXAMPLE 6

A positive electrode sheet C was manufactured similarly to the positive electrode sheet A, except that the active material density of the positive electrode active material layer was set at 1.9 g/cm$^3$. At this time, Ap was 8.1 ml and Bp was 1.025. A lithium ion secondary battery according to Example 6 was then manufactured using the positive electrode sheet C instead of the positive electrode sheet A but otherwise similarly to Example 1. The injection amount X at this time was 31.2 ml.

EXAMPLE 7

A lithium ion secondary battery according to Example 7 was constructed similarly to the lithium ion secondary battery according to Example 1. At this time, Ap was 6.7 ml and Bp was 1.04.

EXAMPLE 8

A positive electrode sheet D was manufactured similarly to the positive electrode sheet A, except that the active material density of the positive electrode active material layer was set at 2.3 g/cm$^3$. At this time, Ap was 5.1 ml and Bp was 1.06. A lithium ion secondary battery according to Example 8 was then manufactured using the positive electrode sheet D instead of the positive electrode sheet A but otherwise similarly to Example 1. The injection amount X at this time was 28.3 ml.

EXAMPLE 9

A positive electrode sheet E was manufactured similarly to the positive electrode sheet A, except that the active material density of the positive electrode active material layer was set at 2.35 g/cm$^3$. At this time, Ap was 4.8 ml and Bp was 1.074. A lithium ion secondary battery according to Example 9 was then manufactured using the positive electrode sheet E instead of the positive electrode sheet A but otherwise similarly to Example 1. The injection amount X at this time was 28 ml.

EXAMPLE 10

A positive electrode sheet F was manufactured similarly to the positive electrode sheet A, except that the active material density of the positive electrode active material layer was set at 2.4 g/m$^3$. At this time, Ap was 4.5 ml and Bp was 1.09. A lithium ion secondary battery according to Example 10 was then manufactured using the positive electrode sheet F instead of the positive electrode sheet A but otherwise similarly to Example 1. The injection amount X at this time was 27.8 ml.

EXAMPLE 11

A positive electrode sheet G was manufactured similarly to the positive electrode sheet A, except that the active material density of the positive electrode active material layer was set at 2.45 g/cm$^3$. At this time, Ap was 4.2 ml and Bp was 1.113. A lithium ion secondary battery according to Example 11 was then manufactured using the positive electrode sheet G instead of the positive electrode sheet A but otherwise similarly to Example 1. The injection amount X at this time was 27.6 ml.

EXAMPLE 12

A positive electrode sheet H was manufactured similarly to the positive electrode sheet A, except that the active material density of the positive electrode active material layer was set at 2.5 g/cm$^3$. At this time, Ap was 3.9 ml and Bp was 1.13. A lithium ion secondary battery according to Example 12 was then manufactured using the positive electrode sheet H instead of the positive electrode sheet A but otherwise similarly to Example 1. The injection amount X at this time was 27.4 ml.

The resistance ratio after 9000 cycles of high rate charging/discharging was measured in a similar manner to Resistance Measurement Test 1 of Experimental Example 1 in relation to the secondary batteries constructed in accordance with Examples 5 to 12. Measurement results are shown in FIG. 8 and on Table 3.

TABLE 3

| Example | Active material density [g/cm$^3$] | Air space amount (Ap) [ml] | Swelling rate (Bp) | Injection amount X [ml] | Resistance ratio after 9000 cycles of high rate charging/discharging |
|---|---|---|---|---|---|
| Example 5 | 1.8 | 9.1 | 1.017 | 32.2 | 1.62 |
| Example 6 | 1.9 | 8.1 | 1.025 | 31.2 | 1.4 |
| Example 7 | 2.1 | 6.7 | 1.04 | 29.8 | 1.42 |
| Example 8 | 2.3 | 5.1 | 1.06 | 28.3 | 1.4 |
| Example 9 | 2.35 | 4.8 | 1.074 | 28 | 1.42 |
| Example 10 | 2.4 | 4.5 | 1.09 | 27.8 | 1.41 |
| Example 11 | 2.45 | 4.2 | 1.113 | 27.6 | 1.72 |
| Example 12 | 2.5 | 3.9 | 1.13 | 27.4 | 2.38 |

Figure 8:
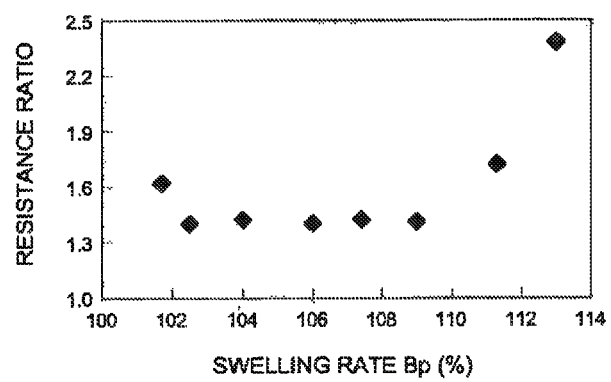
FIG. 8 is a graph showing a relationship between a swelling rate Bp and a resistance ratio between initial and post-cycle resistance values in relation to lithium ion secondary batteries according to Examples 5 to 12.

As shown in FIG. 8 and on Table 3, it was confirmed that when the swelling rate Bp increases beyond 1.11, the resistance ratio increases greatly. It was also confirmed that in the secondary batteries where the swelling rate Bp was within a range of 1.02 to 1.09, the resistance ratio and the increase in resistance were small. As a result, it was confirmed that an appropriate range for the swelling rate Bp of the positive electrode sheet is 1.01 to 1.11, and preferably 1.02 to 1.09 (more preferably, 1.025 to 1.09).

EXPERIMENTAL EXAMPLE 3

[Negative Electrode Active Material Layer Performance Evaluation Test]

Furthermore, in Examples 1 to 4, the wound electrode assembly was manufactured using the negative electrode sheet A (having a active material density of 1 g/cm³, an An of 7 ml, and a Bn of 1.03), whereupon variation in the battery performance of the lithium ion secondary battery according to the swelling rate Bn of the negative electrode sheet was measured.

EXAMPLE 13

A negative electrode sheet B was manufactured similarly to the negative electrode sheet A, except that the active material density of the negative electrode active material layer was set at 0.88 g/cm³. At this time, An was 9.8 ml and Bn was 1.015. A lithium ion secondary battery according to Example 13 was then manufactured using the negative electrode sheet B instead of the negative electrode sheet A but otherwise similarly to Example 1. The injection amount X at this time was 32.5 ml.

EXAMPLE 14

A negative electrode sheet C was manufactured similarly to the negative electrode sheet A, except that the active material density of the negative electrode active material layer was set at 0.93 g/cm³. At this time, An was 8.6 ml and Bn was 1.022. A lithium ion secondary battery according to Example 14 was then manufactured using the negative electrode sheet C instead of the negative electrode sheet A but otherwise similarly to Example 1. The injection amount X at this time was 31.4 ml.

EXAMPLE 15

A lithium ion secondary battery according to Example 15 was constructed similarly to the lithium ion secondary battery according to Example 1. At this time, An was 7 ml and Bn was 1.03.

EXAMPLE 16

A negative electrode sheet D was manufactured similarly to the negative electrode sheet A, except that the active material density of the negative electrode active material layer was set at 1.2 g/cm³. At this time, An was 3.6 ml and Bn was 1.055. A lithium ion secondary battery according to Example 16 was then manufactured using the negative electrode sheet 1 instead of the negative electrode sheet A but otherwise similarly to Example 1. The injection amount X at this time was 26.4 ml.

EXAMPLE 17

A negative electrode sheet E was manufactured similarly to the negative electrode sheet A, except that the active material density of the negative electrode active material layer was set at 1.3 g/cm³. At this time, An was 2.4 ml and Bn was 1.07. A lithium ion secondary battery according to Example 17 was then manufactured using the negative electrode sheet E instead of the negative electrode sheet A but otherwise similarly to Example 1. The injection amount X at this time was 25.2 ml.

EXAMPLE 18

A negative electrode sheet F was manufactured similarly to the negative electrode sheet A, except that the active material density of the negative electrode active material layer was set at 1.4 g/cm³. At this time, An was 1.3 ml and Bn was 1.086. A lithium ion secondary battery according to Example 18 was then manufactured using the negative electrode sheet F instead of the negative electrode sheet A but otherwise similarly to Example 1. The injection amount X at this time was 24 ml.

EXAMPLE 19

A negative electrode sheet G was manufactured similarly to the negative electrode sheet A, except that the active material density of the negative electrode active material layer was set at 1.45 g/cm³. At this time, An was 0.8 ml and Bn was 1.11. A lithium ion secondary battery according to Example 19 was then manufactured using the negative electrode sheet G instead of the negative electrode sheet A but otherwise similarly to Example 1. The injection amount X at this time was 23.5 ml.

EXAMPLE 20

A negative electrode sheet H was manufactured similarly to the negative electrode sheet A, except that the active material density of the negative electrode active material layer was set at 1.5 g/cm³. At this time, An was 0.3 ml and Bn was 1.127. A lithium ion secondary battery according to Example 20 was then manufactured using the negative electrode sheet H instead of the negative electrode sheet A but otherwise similarly to Example 1. The injection amount X at this time was 22.9 ml.

Figure 9:
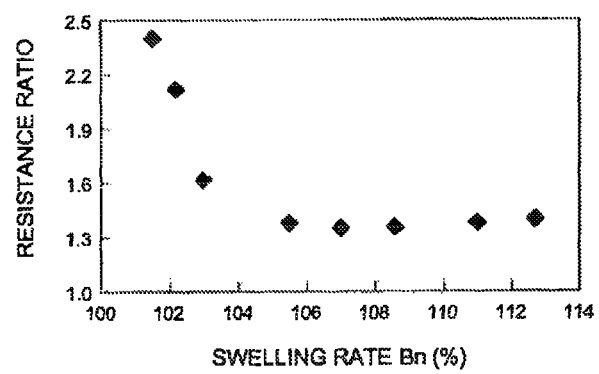
FIG. 9 is a graph showing a relationship between a swelling rate Bn and the resistance ratio between the initial and post-cycle resistance values in relation to lithium ion secondary batteries according to Examples 13 to 20.

The resistance ratio after 9000 cycles of high rate charging/discharging was measured similarly to Resistance Measurement Test 1 of Experimental Example 1 in relation to one of two secondary batteries constructed in accordance with Example 13. The measurement ratio was then measured likewise in relation to the secondary batteries according to Examples 14 to 20. Measurement results are shown in FIG. 9 and on Table 4.

Figure 10:
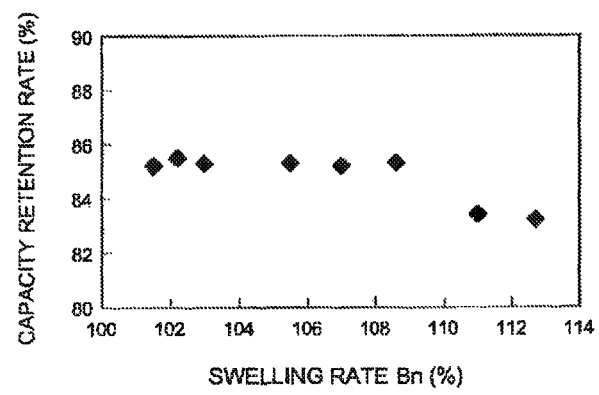
FIG. 10 is a graph showing a relationship between the swelling rate Bn and a capacity retention rate in relation to the lithium ion secondary batteries according to Examples 13 to 20.

Further, 4000 cycles of charging/discharging were performed on the other of the two secondary batteries constructed in accordance with Example 13, whereupon a capacity retention rate after 4000 cycles was measured. As regards the charging/discharging conditions of a single cycle, CCCV charging (constant current constant voltage charging) was performed to an upper limit voltage of 4.1V at 2 C and at a measurement temperature of 60° C., whereupon CC discharging (constant current discharging) was performed to a lower limit voltage of 3.0 V at 2 C. The capacity retention rate [%] was then calculated from a discharge capacity in a 4000th cycle relative to the discharge capacity in a 1st cycle. Results are shown in FIG. 10 and on Table 4.

TABLE 4

| Example | Active material density [g/cm³] | Air space amount (An) [ml] | Swelling rate (Bn) | Injection amount X [ml] | Resistance ratio after 9000 cycles of high rate charging/discharging | Capacity retention rate [%] |
|---|---|---|---|---|---|---|
| Example 13 | 0.88 | 9.8 | 1.015 | 32.5 | 2.4 | 85.2 |
| Example 14 | 0.93 | 8.6 | 1.022 | 31.4 | 2.12 | 85.5 |
| Example 15 | 1 | 7 | 1.03 | 29.8 | 1.62 | 85.3 |
| Example 16 | 1.2 | 3.6 | 1.055 | 26.4 | 1.38 | 85.3 |
| Example 17 | 1.3 | 2.4 | 1.07 | 25.2 | 1.35 | 85.2 |
| Example 18 | 1.4 | 1.3 | 1.086 | 24 | 1.36 | 85.3 |
| Example 19 | 1.45 | 0.8 | 1.11 | 23.5 | 1.38 | 83.4 |
| Example 20 | 1.5 | 0.3 | 1.127 | 22.9 | 1.4 | 83.2 |

As shown in FIG. 9 and on Table 4, it was confirmed that in a secondary battery in which the swelling rate Bn is larger than 1.03 (preferably 1.05), the resistance ratio is reduced. Further, as shown in FIG. 10 and on Table 4, it was confirmed that in a secondary battery in which the swelling rate Bn is smaller than 1.09, a superior capacity retention rate is obtained. It was therefore confirmed from these results that the appropriate swelling rate Bn of the negative electrode sheet is 1.03 and more, preferably between 1.03 and 1.09 (between 1.03 and 1.086, for example), and more preferably between 1.05 and 1.09 (between 1.055 and 1.086, for example).

Specific examples of the present invention were described in detail above, but these are merely examples and do not limit the scope of the claims. Techniques described in the claims include various amendments and modifications implemented on the specific examples described above.

Figure 11:
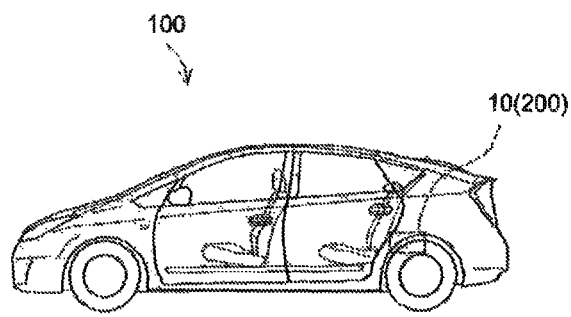
FIG. 11 is a schematic side view showing a vehicle (an automobile) including the secondary battery according to the present invention.

In the secondary battery (a lithium ion secondary battery, for example) and the battery pack manufactured using the method according to the present invention, an appropriate amount of electrolyte is injected, and therefore the electrolyte does not become deficient during high rate charging/discharging. As a result, a secondary battery having superior characteristics, in which increases in resistance and leakage of the lithium salt contained in the electrolyte are prevented, can be obtained. With these characteristics, the secondary battery according to the present invention can be used particularly favorably as a power supply for a motor installed in a vehicle such as an automobile. Therefore, according to the present invention, as shown schematically in FIG. 11, a vehicle 100 (typically an automobile, and more particularly an automobile that includes a motor, such as a hybrid automobile or an electric automobile) having the secondary battery 10 (which may be in the form of the battery pack 200 formed by connecting a plurality of the batteries 10 in series) as a power supply can be provided.

REFERENCE SIGNS LIST 10 lithium ion secondary battery (secondary battery)
15 cell case
20 opening portion
25 lid
30 case main body
35A, 35B inner side
40 safety valve
50 wound electrode assembly
55A, 55B flattened surface
60 positive electrode terminal
62 positive electrode collector
64 positive electrode sheet (positive electrode)
66 positive electrode active material layer
80 negative electrode terminal
82 negative electrode collector
84 negative electrode sheet (negative electrode)
90 negative electrode active material layer
95 separator sheet
100 vehicle (automobile)
110 cooling plate
120 end plate
130 restraining band
140 connecting member
150 spacer member
155 screw
200 battery pack (secondary battery)

The invention claimed is:

1. A method for manufacturing a secondary battery, comprising:
   preparing an elongated positive electrode sheet in which a positive electrode active material layer is formed on a positive electrode collector;
   preparing an elongated negative electrode sheet in which a negative electrode active material layer is formed on a negative electrode collector;
   forming a flattened wound electrode assembly by winding the positive electrode sheet and the negative electrode sheet between which an elongated separator sheet is interposed;
   housing the wound electrode assembly in an angular cell case having two wide surfaces that correspond respectively to flattened surfaces of the wound electrode assembly;
   binding the cell case by applying a load to the two opposing wide surfaces of the cell case from an outside of the cell case such that the wide surfaces approach each other; and
   injecting a non-aqueous electrolyte into the bound cell case,
   wherein an injection amount X [ml] of the non-aqueous electrolyte is determined on the basis of a following Equation (1):

$$X = (Ap \times Bp) + (An \times Bn) + C + (D \times E) \qquad (1)$$

in Equation (1), Ap is an amount of air space [ml] in the positive electrode active material layer, and Bp is a swelling rate determined from $Tp_1/Tp_0$, where $Tp_0$ is a thickness of the positive electrode active material layer before the positive electrode active material layer is impregnated with the non-aqueous electrolyte and $Tp_1$ is a thickness of the positive electrode active material layer after the positive electrode active material layer is impregnated with the non-aqueous electrolyte,
   An is an amount of air space [ml] in the negative electrode active material layer, and Bn is a swelling rate determined from $Tn_1/Tn_0$, where $Tn_0$ is a thickness of the negative electrode active material layer before the negative electrode active material layer is impregnated with the non-aqueous electrolyte and $Tn_1$ is a thickness of the negative electrode active material layer after the negative electrode active material layer is impregnated with the non-aqueous electrolyte, C is an amount of air space [ml] in the separator sheet, D is a total surface area [cm$^2$] of an opposing surface of the positive electrode active material layer and the negative electrode active material layer, and E is a reference electrolyte amount [ml/cm$^2$] per unit surface area of the opposing surface, which is determined in accordance with a binding rate [%] determined from $(L_0-L_1)/L_0 \times 100$, where $L_0$ is a distance between an inner side of the wide surface of the cell case and the flattened surface of the wound electrode assembly before the cell case is bound and $L_1$ is a distance between the inner side of the wide surface of the cell case and the flattened surface of the wound electrode assembly after the cell case is bound.

2. The manufacturing method according to claim 1, wherein when the cell case is bound such that the binding rate is between 90% and 100%, a value of E is determined within a range of $0.9 \times 10^{-3}$ ml/cm$^2$ to $1.7 \times 10^{-3}$ ml/cm$^2$.

3. The manufacturing method according to claim 1, wherein a positive electrode sheet having a positive electrode active material layer with a active material density set such that a value of Bp is within a range of 1.02 to 1.09 is used.

4. The manufacturing method according to claim 1, wherein a negative electrode sheet having a negative electrode active material layer with a active material density set such that a value of Bn is within a range of 1.03 to 1.09 is used.

5. The manufacturing method according to claim 1, wherein a plurality of the cell cases each housing the wound electrode assembly are arranged such that the wide surfaces of the respective cell cases oppose each other, the plurality of cell cases are bound by applying a load to the plurality of cell cases in an arrangement direction thereof, and an amount of the non-aqueous electrolyte to be injected into each of the cell cases is determined on the basis of the binding rate of each of the cell cases.

* * * * *